H. W. HILL.
Improvement in Instruments for Ringing Hogs.
No. 130,853. Patented Aug. 27, 1872.
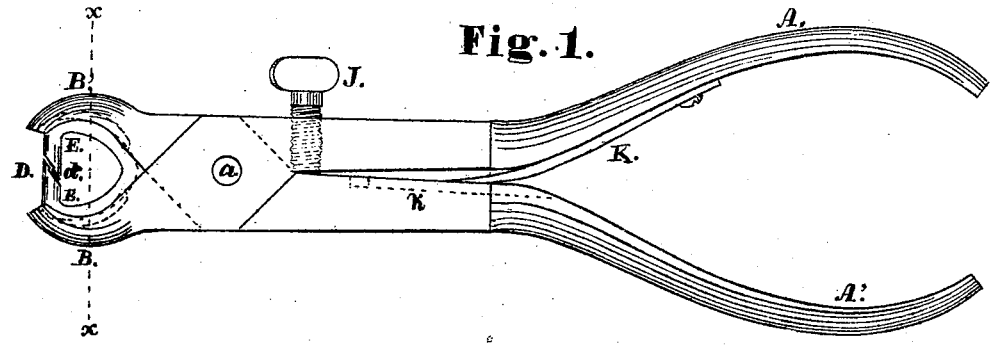
Fig. 1.
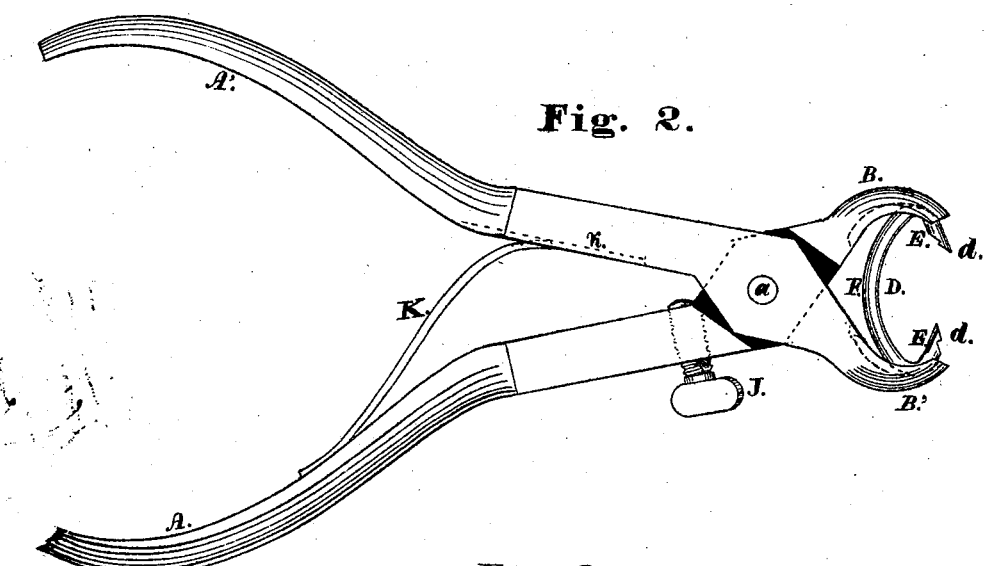
Fig. 2.
Fig. 3.
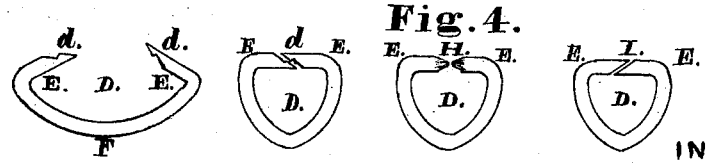
Fig. 4.
WITNESSES:
Edwin N. Lapham,
Frank A. Leforgee,
INVENTOR:
Hugh W. Hill,
per Chas. P. Housum,
HIS ATTORNEY.

UNITED STATES PATENT OFFICE.

HUGH W. HILL, OF DECATUR, ILLINOIS.

IMPROVEMENT IN IMPLEMENTS FOR RINGING HOGS.

Specification forming part of Letters Patent No. 130,853, dated August 27, 1872.

Specification describing certain Improvements in Implements for Ringing Hogs, invented by HUGH W. HILL, of Decatur, in the county of Macon and State of Illinois.

My invention relates to an improvement in implements for inserting a ring in a hog's snout; and consists, first, in a pair of nippers, the jaws of which are concave and provided with grooves which hold the ring; and second, in the form and construction of the ring used with the implement. A set-screw regulates and acts as a stop for the jaws and the ring, so that different sizes of rings can be used.

Figure 1 is a plan of an implement embodying my invention with the jaws closed; Fig. 2, a plan of the same with the jaws open; Fig. 3, a section on the dotted lines $x\ x$, Fig. 1; and Fig. 4 represents the rings both open and closed.

A A' are the handles, and B B' the jaws, pivoted at $a$. The jaws are concave and grooved, as shown at C C', Fig. 3. D is the ring. A piece of wire is cut the length of the circumference of the ring that is desired, the ends E E bent at right angles, and the center rounded, as shown at F, Figs. 2 and 4. The points of the ring may be made with the catch $d$, as shown in Figs. 1, 2, and 4, or pointed, as shown at H, or beveled off, as shown at I in Fig. 4. These rings may be made of malleable-iron, (open,) as shown in Figs. 2 and 4, or of annealed wire. If wire is used that is not annealed, the catch $d$ should be made on the points, as the wire may spring back some, and the catch will prevent this and hold the points together. J is a thumb-screw in the handle A. When a large ring is used the thumb-screw is set so that just as the points of the ring engage, the end of the screw shall touch the inside of the handle A', and prevent the points of the rings from passing each other too far.

The instrument is operated as follows, viz.: A ring is placed in the jaws and closed, and the set-screw adjusted, as is above described. An open ring is then placed in the jaws, the grooves holding it, and placed over the end of the hog's snout and closed, the points being sharp enough to cut through the gristle on a hog's snout, and the instrument removed. The center of the ring bends first, and the ring is formed in the triangular shape shown in Figs. 1 and 4. A spring, K, forces the handles apart, the loose end $k$ sliding in a slot in the handle A', as shown by the dotted lines.

A round ring may be used, but the triangular-shaped ring is preferable, as when it is closed it cannot turn in the snout, and it is not so liable to open as a round ring, and it fits the end of the snout closely, so that it is not liable to catch on anything and be torn out.

The instrument can be made large and strong, and used with the same form of rings for oxen or other large animals.

I claim as my invention—

1. The jaws B B', with the grooves C C', adapted to operate on the ring D, as shown and described, and for the purpose set forth.

2. The triangular-shaped ring D, with the catch $d$, or with the points H or bevels I, substantially as shown and described, and for the purpose set forth.

HUGH W. HILL.

Witnesses:
 CHARLES P. HOUSUM,
 JOHN GROSS.